United States Patent
Hüsken et al.

(10) Patent No.: US 8,757,973 B2
(45) Date of Patent: Jun. 24, 2014

(54) ADJUSTING DEVICE FOR ADJUSTING THE ROTATION ANGLE POSITION OF THE ROTOR OF A WIND ENERGY SYSTEM

(75) Inventors: Michael Hüsken, Nordhorn (DE); Ulf Nosthoff, Münster (DE); Ulrich Uphues, Rheine (DE); Markus Becker, Münster (DE)

(73) Assignee: Kenersys GmbH, Münster (DE)

( * ) Notice: Subject to any disclaimer, the term of this patent is extended or adjusted under 35 U.S.C. 154(b) by 624 days.

(21) Appl. No.: 13/058,667

(22) PCT Filed: Aug. 11, 2009

(86) PCT No.: PCT/EP2009/060389
§ 371 (c)(1),
(2), (4) Date: Feb. 11, 2011

(87) PCT Pub. No.: WO2010/020563
PCT Pub. Date: Feb. 25, 2010

(65) Prior Publication Data
US 2011/0142647 A1    Jun. 16, 2011

(30) Foreign Application Priority Data
Aug. 18, 2008  (DE) .......................... 10 2008 038 128

(51) Int. Cl.
*F03D 7/02* (2006.01)

(52) U.S. Cl.
USPC ............. 416/32; 416/60; 416/159; 415/122.1

(58) Field of Classification Search
USPC ............... 416/31, 32, 60, 155, 159, 162, 166, 416/167, 168 R, 62; 415/61, 122.1, 123, 415/124.1, 124.2, 150, 118
See application file for complete search history.

(56) References Cited

U.S. PATENT DOCUMENTS

| | | | |
|---|---|---|---|
| 4,502,667 A * | 3/1985 | Nakamura .................... | 254/350 |
| 5,035,575 A * | 7/1991 | Nielsen et al. .................... | 416/9 |
| 7,397,145 B2 | 7/2008 | Struve et al. .................... | 290/55 |
| 2005/0284648 A1 * | 12/2005 | Frauhammer et al. ........ | 173/176 |
| 2006/0135267 A1 * | 6/2006 | Bosk .............................. | 464/43 |
| 2006/0153675 A1 * | 7/2006 | Rogall et al. ............... | 415/170.1 |
| 2007/0187954 A1 * | 8/2007 | Struve et al. .................... | 290/44 |
| 2007/0295559 A1 * | 12/2007 | Schliep .......................... | 185/33 |
| 2008/0181761 A1 * | 7/2008 | Moore et al. ...................... | 415/1 |

FOREIGN PATENT DOCUMENTS

DE  10 2004 013624    10/2005
EP        1 167 755     1/2002

* cited by examiner

*Primary Examiner* — Nathaniel Wiehe
*Assistant Examiner* — Aaron Jagoda
(74) *Attorney, Agent, or Firm* — Roberts & Roberts, LLP

(57) ABSTRACT

An adjusting device for adjusting the rotation angle position of the rotor of a wind energy system should be improved by the invention, whereby a complicated processing of the brake disc previously used for engagement of the drive is no longer necessary, and whereby said brake disc can be flexibly arranged in an area with sufficient construction space. For this purpose, the adjusting device has at least one force transducer wheel and/or a force transducing disc which is mounted or can be mounted on a shaft (1) of the drive train which is switched downstream from the rotor, which is structured for engagement of a force transmitting means, and is designed as an independent component. The device also has a drive means for producing a drive force, and at least one force transmission means for transmitting the drive force to the force transducer wheel and/or the force transducing disc.

19 Claims, 3 Drawing Sheets

ADJUSTING DEVICE FOR ADJUSTING THE ROTATION ANGLE POSITION OF THE ROTOR OF A WIND ENERGY SYSTEM

FIELD OF THE INVENTION

The invention relates to an adjusting device for adjusting the rotation angle position of the rotor of a wind energy system.

PRIOR ART

In wind energy systems, especially for maintenance repair purposes, it is often necessary not only to stop the rotor of the system but also to put it into a predetermined rotation angle position, at which a particular one of the rotor blades points vertically downward, for instance, along the tower.

This kind of adjustment can be done from outside, for instance by attaching suitable force transmission means to the rotor blades and pulling; alternatively, one of the shafts in the drive train can be mechanically rotated and the rotor can thus be adjusted in its rotation angle position.

In European Patent Disclosure EP 1 167 755 A2, in a locking device for the rotor of a wind energy system, which device includes a brake disc, which is intended to be stopped by means of brake shoes and which is disposed on a shaft in the drive train of a wind energy system and provided with an external set of teeth, and an engagement means for putting a further toothed element into engagement with the external set of teeth of the brake disc for additional locking thereof, it is proposed that, by means of the external set of teeth of the brake disc and a pinion that can be put into engagement with this external set of teeth, active rotation of the shaft and thus an adjustment of the rotation angle position of the rotor of a wind energy system can also be made possible. For that purpose, a suitable hand tool in the form of a torque screwdriver is provided, which can be inserted into an internal set of teeth of the drive pinion and thus can drive the drive pinion by motor and hence, by way of the engagement with the external set of teeth of the brake disc, can rotate a brake disc, and thus the shaft and the rotor connected to it, as well.

This version is necessarily problematic and inadequate in various respects. For instance, introducing the circumferential set of teeth into a brake disc is complicated, because of the special hardening and handling of the material of the brake disc, and involves an increased amount of labor and equipment. Moreover, in the vicinity of the machine housing (called a nacelle) of the wind energy system, which covers or surrounds the drive train and where the brake disc is disposed, the space is quite restricted. Thus it is often not easy to provide the capability of an additional drive pinion and the capability of applying the torque screwdriver. Finally, the version disclosed in this reference, because of the use of a torque screwdriver that must necessarily be used by a human user, remote-controlled actuation of the adjusting device of this kind is not possible. In this sense, when a certain rotation angle of the rotor is to be approached, either the person using the torque screwdriver must interrupt the adjustment operation in order to determine the current rotation angle position of the rotor by visual monitoring and calibrate it with the outcome sought, or a second person must get into contact, via a suitable communications connection, with the person using the torque screwdriver and give an appropriate signal for stopping the torque screwdriver once the desired rotation angle position of the rotor is reached.

SUMMARY OF THE INVENTION

Against the background of these recognized inadequacies of the existing versions and to overcome the deficiencies discussed, with the invention an improved adjusting device for adjusting the rotation angle position of the rotor of a wind energy system is to be created and disclosed.

According to the invention, this object is attained by an adjusting device for adjusting the rotation angle position of the rotor of a wind energy system. Advantageous refinements of an adjusting device of this kind are disclosed herein.

One essential aspect and a decisive distinction from the version disclosed in EP 1 167 755, which for the engagement of an adjusting drive used an external set of teeth in the brake disc of the wind energy system, which teeth furthermore serve to lock the rotation angle position of the rotor, resides according to the invention in disposing a force transducing wheel or force transducing disc as an independent component on a shaft in the drive train. Thus in a distinction from the prior art, the brake disc, which because of the particular choice of material and handling of material can be structured with difficulty if at all and is often disposed at an inaccessible point in the drive train, is not employed for introducing a force for rotating a rotor; instead, for that purpose, a separate component explicitly reserved for that use is provided. That component can in principle be positioned freely on a shaft in the drive train; preferably, it is disposed at a point where there is still enough room available in the machine housing or in the nacelle of the wind energy system.

The force transducing wheel or force transducing disc is structured for the engagement of a force transmission means. The structure intrinsically depends on the type of force transmission means; in particular, it can be a circumferential set of teeth.

The force transmission means to be provided according to the invention, for transmitting the drive force of the drive means to the force transducing wheel or force transducing disc, can advantageously include a chain, or belt, preferably a toothed belt, engaging the force transducing disc or force transducing wheel. This kind of version, especially if the chain or belt is embodied as divisible, makes simple coupling of the force transducing disc or force transducing wheel to the drive means, and disconnection from it, possible. Coupling and disconnection of this kind are especially advantageous, although not necessarily required, since in the normal mode of operation of the wind energy system, when the shaft driven by the rotor is rotating, slaved rotation of the force transmission means and especially of the drive means is unwanted and in fact can be harmful.

In principle, it is also possible to embody the force transmission means using a drive pinion 4', as shown in FIG. 1, which engages the force transducing disc or force transducing wheel (see claim 5).

Depending on the embodiment of the drive means, it can be advantageous or even necessary to provide a gear in the force transmission means, in particular a step-up or step-down gear.

A further possibility of "shifting to neutral" of the adjusting device in the normal mode of operation of the wind energy system is to connect the force transducing wheel or force transducing disc to the shaft via a clutch, which in the normal mode of operation of the wind energy system disengages. In this way as well, it is ensured that in the normal mode of operation of the wind energy system, with the shaft in the drive train rotating and driven by the rotor, the adjusting device is not forced to rotate; such rotation could damage parts of the adjusting device, especially its drive means.

Furthermore, it is also possible to embody the force transducing wheel or force transducing disc in such a way that it can be disposed detachably on the shaft of the drive train, for instance by means of a clamping set. Thus with only a few manipulations, if needed, the force transducing wheel or force transducing disc can be disposed on the shaft and connected to it in a manner fixed against relative rotation, so that an adjustment of the rotation angle of the rotor can be made by means of the force transmission means and the drive means.

The drive means can on the one hand be installed, for instance in the form of a drive motor, fixedly in the wind energy system, in particular in its nacelle, but it can also take the form of a tool, in particular a motor-driven tool, to be carried by an arbitrary person and fixable for use in the wind energy system. The first variant above has the advantage in particular that a fixedly installed drive can be designed in such a way that it generates high torques and in that manner makes forceful adjustment of the rotor position possible. The second variant has the advantage that for multiple wind energy systems, only a limited number of hand tools have to be kept on hand, and furthermore, less space in the nacelle of the wind energy system is permanently occupied.

In order when there is a strong counterpart load to prevent the drive means from being overloaded and hence harmed, the drive means can be equipped with an overload safety device, in particular a torque limiter, which can for instance be a slipping clutch.

Advantageously, the drive means is controllable via remote operation or a remote monitoring. This permits actuation of the drive means and hence adjustment of the rotation angle position of the rotor out of a position in which a user can see into the rotor of the wind energy system, and in this sense can by himself, reliably and in a simple way, monitor the approach to a desired position.

In order furthermore to be able to approach rotation angle positions of the rotor in automated fashion, the adjusting device can be embodied in accordance with a refinement. Via the controller, which receives position data from the rotor position sensors, the drive means can be automatically actuated and switched for approaching a rotor position that has been input to the controller beforehand.

If strong forces or high torque is required to engage the shaft in the drive train in order to rotate the rotor, forces or torque that cannot be generated by a single drive means or can no longer be withstood by a force transmission means, then a plurality of force transducing discs or wheels 5, 5' are disposed either parallel to one another, as shown in FIG. 2, or at various points within the drive train and are connected, via their own force transmission means 4, 4', either to one common drive or each to their own drive (see claim 14).

Preferably, the force transducing disc or force transducing wheel is disposed or can be disposed on a shaft on the high-speed side of the drive train, in particular on the gear shaft or the generator shaft. Disposing it in this region has two advantages. First, a lesser force or torque has to be exerted for adjusting the rotation angle position of the rotor on this shaft, then on a slow shaft between the generator and the gear. Second, in the vicinity of this shaft inside the machine housing or the nacelle of the wind energy system, there is often enough space for disposing the additional components while still allowing access to them.

In a further variant, it is also conceivable to use the adjusting device of the invention in the reverse way, for instance in the spinning mode of the wind energy system to tap a drive force, for instance for driving an additional geared pump or other units that are intended to ensure emergency operation.

BRIEF DESCRIPTION OF THE DRAWING

Further advantages and characteristics of the invention will become apparent from the ensuing description of an exemplary embodiment in conjunction with the appended.

WAY(S) FOR EMBODYING THE INVENTION

Figure 1:
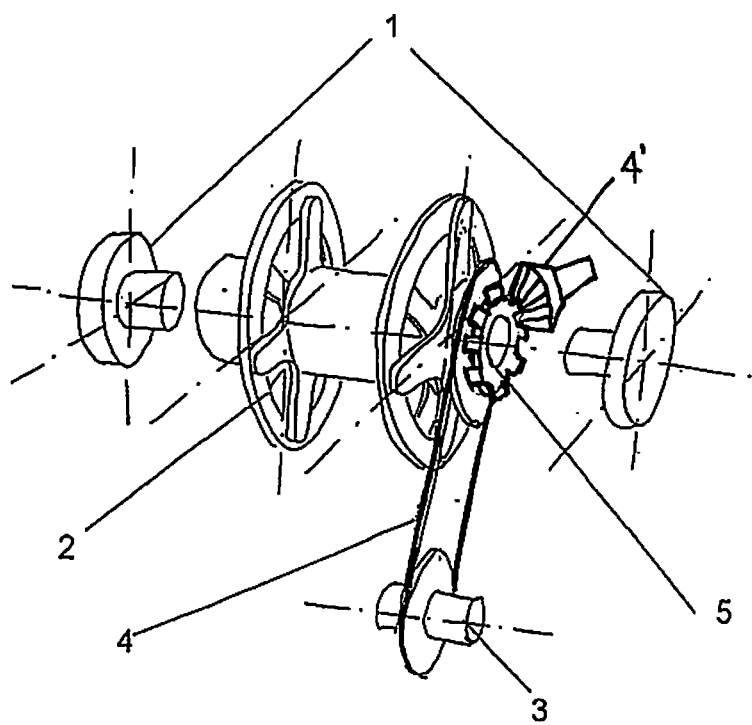
FIGS. 1, 2, and 3 show basic sketches of an adjusting device of the invention.
Figure 2:
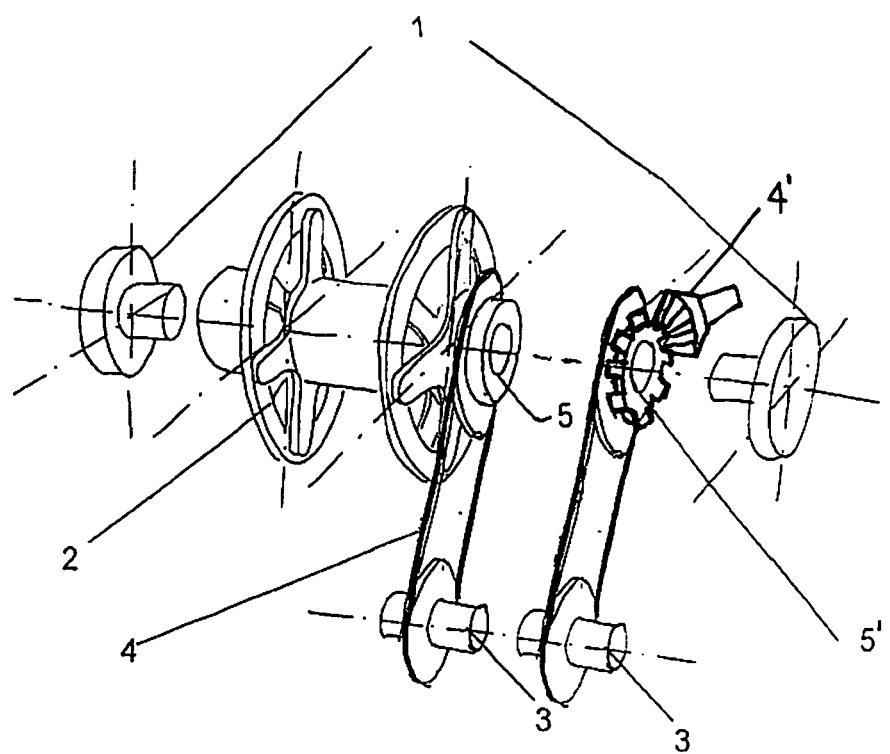
Figure 3:
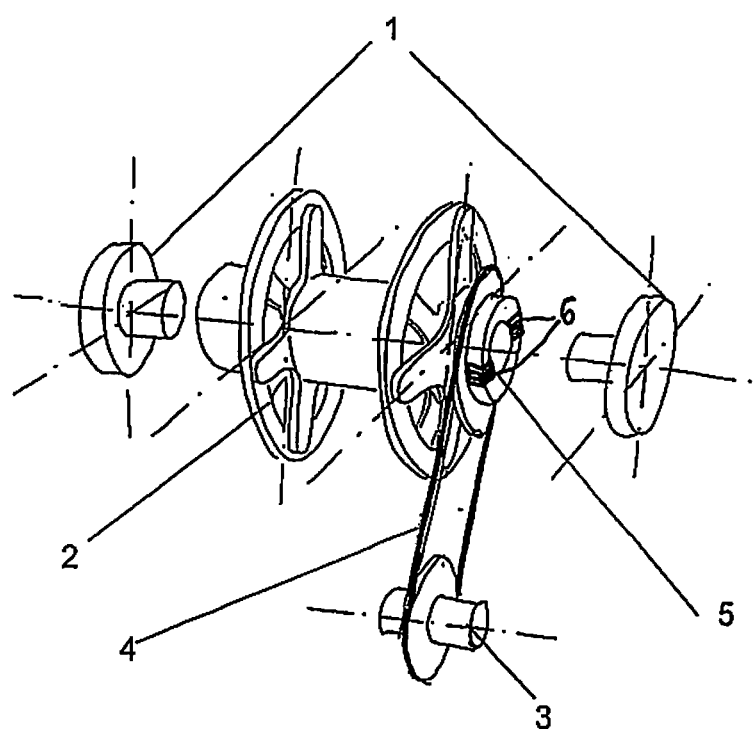

The principle of the invention and an adjusting device of the invention are shown schematically in an exemplary embodiment in a basic illustration in the sole drawing, FIG. 1, and will be explained hereinafter. The adjusting device of the invention is shown here with its essential parts and is or can be disposed in the vicinity of a shaft 1 of the drive train of a wind energy system. In this exemplary embodiment, the wind energy system is a shaft rotating at high speed and is located downstream of a step-up gear, which steps the comparatively low rpm of the rotor up to the high rpm at which the shaft rotating at high speed is driven.

Reference numeral 2 here designates a clutch by means of which the shaft 1 can be disengaged and the drive train interrupted to that extent. In this exemplary embodiment, in the vicinity of the clutch 2, a force transducing wheel 5 is or can be disposed on the shaft 1. In principle, it does not matter whether the force transducing wheel 5 is disposed or can be disposed on the shaft 1 in a portion between the clutch and the generator, or on a portion of the shaft 1 between the clutch and the gear. The positioning of the force transducing wheel 5 will be done wherever there is enough room available within the drive train not only for the force transducing wheel 5 but also to furnish enough room for connecting a suitable drive.

Other components of the adjusting device of the invention in this exemplary embodiment form a force transmission wheel 3, drivable by a drive, not further shown here, and a force transmission means 4, fastened between the force transmission wheel 3 and the force transducing wheel 5, and this force transmission means here takes the form of a belt or chain.

The force transducing wheel 5 may (not shown in further detail here) be mounted on the shaft 1 via a clutch mechanism, which makes it possible to disengage the force transducing wheel 5 and thus allows freewheeling of the wheel when the wheel is not in use. Alternatively, which at present is preferred, the force transducing wheel 5 can be mounted or disposed detachably on the shaft 1, in particular by means of a clamping set 6. In that case, the force transmission means 4 embodied as a belt or chain is embodied in divisible form, so that once the force transducing wheel 5 has been mounted, with the aid of the clamping set 6, it can be extended around the force transmission wheel 3 and the force transducing wheel 5 and put together to make a closed belt or chain, and after use, can be detached and removed again accordingly.

The force transmission wheel 3 is supported in a bearing, not shown in detail here, with a predetermined spacing from the shaft 1 and is driven either mechanically, for instance via a crank or the like, or by motor, for instance via a mobile motor drive or a fixedly installed motor.

If the rotor position is to be adjusted, for instance for performing maintenance work on a particular rotor blade, then the force transducing wheel 5, if it is not fixedly mounted on the shaft 1, is disposed there, for instance by means of the clamping set, or, if it can be disengaged, it can be engaged, and the force transmission means 4 is attached and clamped. Then, a suitable drive force is exerted on the force transmission wheel 3, so that via the force transmission means 4 and the force transducing wheel 5, the shaft 1 is rotated. To avoid slip of the force transmission means 4 here, the force transducing wheel 5 is structured accordingly, and in particular provided with a circumferential set of teeth. The same is then true for the force transmission wheel 3. The force transmission means 4, as a chain or toothed belt, can engage the circumferential sets of teeth and thus ensures slip-free transmission of the drive force.

Since the force transducing wheel 5 is preferably disposed on the shaft rotating at high speed of the drive train, the rotor can be moved and adjusted in its position by a comparatively low torque.

The adjusting device of the invention is flexible to manipulate and can be produced economically. In particular, the production of a force transducing wheel is more economical than circumferential machining of a brake disc in the drive train of the wind energy system. Moreover, as a separate part, the force transducing wheel 4 can be positioned arbitrarily on the shaft 1 and is not dependent on the position of the brake. Thus the adjusting device can be provided in a region which keeps enough installation space and room for human operation available.

The basic illustration in FIG. 1 is highly schematic and serves the purpose solely of explanation. In particular, still other embodiments are conceivable. For instance, instead of a force transmission means shown in the sketch as a belt or chain, force transmission from the force transmission wheel 3 to the force transducing wheel 5 can be provided by means of a gear and intermeshing pinions; the force transmission wheel 3 can also mesh directly with a corresponding circumferential set of teeth of the force transducing wheel 5 and thus ensure transmission of the drive force.

The invention claimed is:

1. An adjusting device for adjusting the rotation angle position of the rotor of a wind energy system, comprising at least one force transducing wheel or force transducing disk embodied as an independent component and mounted or mountable on a shaft of the drive train downstream of the rotor and structured for the engagement of a force transmission means, having a drive means for generating a drive force, and having at least one force transmission means for transmitting the drive force to the force transducing wheel or force transducing disc, wherein the at least one force transmission means includes a chain or a belt that engages the force transducing disc or force transducing wheel, and wherein the chain or the belt is embodied as divisible.

2. The adjusting device as defined by claim 1, wherein the force transducing wheel or the force transducing disc is provided with a circumferential set of teeth.

3. The adjusting device as defined by claim 1 wherein the belt comprises a toothed belt.

4. The adjusting device as defined claim 1 wherein the force transmission means further includes a drive pinion that engages the force transducing disc or force transducing wheel.

5. The adjusting device as defined by claim 1 wherein the force transmission means further includes a gear.

6. The adjusting device as defined by claim 1 wherein the force transducing wheel or force transducing disc is disposed detachably on the shaft.

7. The adjusting device as defined by claim 6 wherein the force transducing wheel or force transducing disc is disposed detachably on the shaft by means of a clamping set.

8. The adjusting device as defined by claim 1 wherein the drive means is a drive motor installed fixedly in the wind energy system.

9. The adjusting device as defined by claim 8 wherein the drive means is a drive motor installed fixedly in the wind energy system in a nacelle.

10. The adjusting device as defined by claim 1 wherein the drive means is a tool, that is to be carried by a user and is fixable in the wind energy system for use.

11. The adjusting device as defined by claim 1 wherein the drive means is equipped with an overload safety device.

12. The adjusting device as defined by claim 11 wherein the drive means is equipped with an overload safety device which is a torque limiter.

13. The adjusting device as defined by claim 11 wherein the drive means is equipped with an overload safety device which is a slipping clutch.

14. The adjusting device as defined by claim 1 wherein the drive means is controllable via remote operation or remote monitoring.

15. The adjusting device as defined by claim 1 wherein a rotation angle position sensor for determining the rotation angle of the rotor is provided, which is connected to a control unit for the drive means in such a way that the adjusting device, controlled by the controller can approach a predetermined rotor position detected by the rotor position sensor.

16. The adjusting device as defined by claim 1 comprising at least two parallel-connected force transducing discs or wheels disposed on the shaft as well as at least two force transmission means, one for each force transducing disc or force transducing wheel.

17. The adjusting device as defined by claim 1 wherein the at least one force transducing wheel or force transducing disc is or can be disposed on a shaft on a high-speed side of the drive train.

18. The adjusting device as defined by claim 17, wherein the at least one force transducing wheel or force transducing disc is or can be disposed on a gear shaft or a generator shaft on a high-speed side of the drive train.

19. The adjusting device as defined by claim 1 wherein the force transducing wheel or force transducing disc is connected to the shaft via a clutch.

\* \* \* \* \*